(12) United States Patent
Daley et al.

(10) Patent No.: US 9,418,646 B2
(45) Date of Patent: Aug. 16, 2016

(54) METAMATERIAL (71) Applicant: BAE SYSTEMS PLC, London (GB)

(72) Inventors: Stephen Daley, Southampton (GB); Matthew John Reynolds, Southampton (GB)

(73) Assignee: BAE Systems plc, London (GB)

(*) Notice: Subject to any disclaimer, the term of this patent is extended or adjusted under 35 U.S.C. 154(b) by 0 days.

(21) Appl. No.: 14/774,482

(22) PCT Filed: Mar. 7, 2014

(86) PCT No.: PCT/GB2014/050684
§ 371 (c)(1),
(2) Date: Sep. 10, 2015

(87) PCT Pub. No.: WO2014/140538
PCT Pub. Date: Sep. 18, 2014

(65) Prior Publication Data
US 2016/0019879 A1    Jan. 21, 2016

(30) Foreign Application Priority Data
Mar. 13, 2013    (EP) ..................... 13275054
Mar. 13, 2013    (GB) ................... 1304500.0

(51) Int. Cl.
G10K 11/16     (2006.01)
G10K 11/172    (2006.01)
G10K 11/04     (2006.01)
(Continued)

(52) U.S. Cl.
CPC .......... *G10K 11/172* (2013.01); *B23K 26/0006* (2013.01); *B23K 26/342* (2015.10); *G10K 11/04* (2013.01); *B23K 2203/14* (2013.01); *B33Y 10/00* (2014.12); *B33Y 80/00* (2014.12); *G10K 2210/3026* (2013.01); *G10K 2210/3027* (2013.01); *G10K 2210/32271* (2013.01)

(58) Field of Classification Search
CPC ....................................................... G10K 11/16
USPC ........................................................ 181/207
See application file for complete search history.

(56) References Cited

U.S. PATENT DOCUMENTS

| 2012/0061176 A1 | 3/2012 | Tanielian |
| 2014/0116802 A1* | 5/2014 | Ma ......................... G10K 11/18 181/286 |

(Continued)

FOREIGN PATENT DOCUMENTS

| CN | 102708853 A | 10/2012 |
| WO | 2012/106327 A1 | 8/2012 |

OTHER PUBLICATIONS

GB Search Report dated Jun. 21, 2013 of Patent Application No. GB1304500.0 filed Mar. 13, 2013.

(Continued)

Primary Examiner — Forrest M Phillips
(74) Attorney, Agent, or Firm — Maine Cernota & Rardin (57) ABSTRACT A metamaterial (400) for attenuating acoustic transmission comprises a plurality of layers (410). Each layer (410) comprises a transmission structure (420) and a resonator (450), coupled to the transmission structure (420). The transmission structure (420) in a layer (410) is coupled to the transmission structures (420) of the layers (410) neighboring said layer (410). The resonator (450) in a layer (410) is coupled to the transmission structure (420) of the layers (410) neighboring said layer (410).

15 Claims, 3 Drawing Sheets (51) Int. Cl.
*B23K 26/00* (2014.01)
*B33Y 10/00* (2015.01)
*B33Y 80/00* (2015.01)

(56) References Cited

U.S. PATENT DOCUMENTS

2015/0015930 A1* 1/2015 Hussein .............. G02B 1/002
              359/240
2016/0027427 A1* 1/2016 Yang .................. G10K 11/175
              181/286

OTHER PUBLICATIONS

EP Search Report dated Nov. 22, 2013 of Patent Application No. EP13275054 filed Mar. 13, 2013.

Lee S H et al, Acoustic Metamaterial with negative density, Physics Letters, Col. 373, No. 48, Dec. 7, 2009, pp. 4464-4469, XP026721428, ISSN: 0375-9601, Amsterdam, NL.

Sam Hyeon Lee et al, Composite Acoustic Medium with Simultaneously Negative Density and Modulus, Physical Review Letters, vol. 104, No. 5, Feb. 5, 2010, pp. 054301-1, 054301-2, 054301-4, XP055088933, ISSN: 0031-9007.

Huaijun Chen et al, Double-negative acoustic metamaterial based on hollow steel tube meta-atom, URL:http://arvix.org/ftp/arvix/papers/209/1209.6188.pdf, Sep. 27, 2012, pp. 1-14, XP055089080.

Jae-Hwang Lee et al, Micro-/Nanostructured Mechanical Metamaterials, Advanced Materials, vol. 24, No. 36, Sep. 18, 2012, pp. 4782-4810, XP055057559, ISSN: 0935-9648.

Pope S A et al, Paper; Performance and stability analysis of active elastic metamaterials with tunable double negative response, Smart Materials and Structures, vol. 21, No. 12, Nov. 26, 2012, p. 125021, XP020234047, ISSN: 0964-1726, Bristol, GB.

* cited by examiner

METAMATERIAL

RELATED APPLICATIONS

This application is a national phase application filed under 35 USC §371 of PCT Application No. PCT/GB2014/050684 with an International filing date of Mar. 7, 2014, which claims priority to GB1304500.0, filed Mar. 13, 2013 and EP13275054.8, filed Mar. 13, 2013. Each of these applications is herein incorporated by reference in their entirety for all purposes.

FIELD OF THE INVENTION

This invention relates to the field of metamaterials. In particular, the invention relates to an artificial material engineered to have a low transmissivity of sound waves over a range of acoustic frequencies.

BACKGROUND TO THE INVENTION

Metamaterials are artificial materials that are constructed to have particular properties, typically properties that are not readily found in natural materials. An example of metamaterials is microstructured optical materials constructed to have a very low transmissivity of light over a range of electromagnetic frequencies. Those frequencies are typically referred to as a photonic bandgap, in analogy to the bandgaps seen in the behaviour of electrons in semiconductors. At least some photonic bandgaps can be understood in terms of Bragg scattering of photons in periodic microstructured material. The term "bandgap" is often used to describe a low transmissivity resulting from the structure of the metamaterials, even when a "complete" bandgap (as defined by Bloch-Floquet theory) is not observed.

Subsequent to the development of metamaterials exhibiting such (full or partial) photonic bandgaps, attempts were made to develop metamaterials exhibiting phononic bandgaps, i.e. regions in the frequency spectrum in which the transmissivity of sound quanta or phonons is greatly reduced, leading to very high levels of attenuation. Moreover, unlike traditional periodic materials that have been employed at high frequencies, acoustic metamaterials can include resonant elements that allow band gaps to form within the long wavelength limit. It is at low frequencies where it is most difficult to design satisfactory passive isolation solutions, and hence metamaterials may provide a useful path to high-performance, low-frequency isolation.

The behaviour of locally resonant photonic and phononic metamaterials can be understood in terms of their so-called "left-handedness". In optical material having simultaneously a negative electromagnetic permeability and a negative electromagnetic permittivity at some frequencies (when the material is said to be in its double negative or DNG region), the refractive index has a negative sign so negative refraction occurs. Snell's law of refraction still applies but, because the refractive index is negative, the path of the reflected wave lies on the opposite side of the normal to the reflecting surface to that one would expect in a transmission medium having a positive refractive index, and the group and phase velocity vectors are anti-parallel.

In acoustic metamaterials, the analogues of permeability and permittivity are density and bulk modulus, respectively. Thus, negative refraction occurs when the density and bulk modulus of the metamaterials are simultaneously negative. As discussed above, and as with optical metamaterials, gaps appear in the dispersion characteristics of metamaterials, at high frequencies due to Bragg scattering effects related to the periodic properties of the metamaterial. In metamaterials where low frequency resonances occur, gaps can also occur at lower, resonant frequencies, typically at frequencies around two orders of magnitude lower than the Bragg bandgaps. This leads to high levels of attenuation in the transmission characteristics of the material at these frequencies. Such low sound transmissivity has the potential to produce novel acoustic behaviour beyond that seen in naturally occurring media, with potential applications including acoustic cloaking, transmission blocking, and sub-wavelength acoustic lenses.

Figure 1:
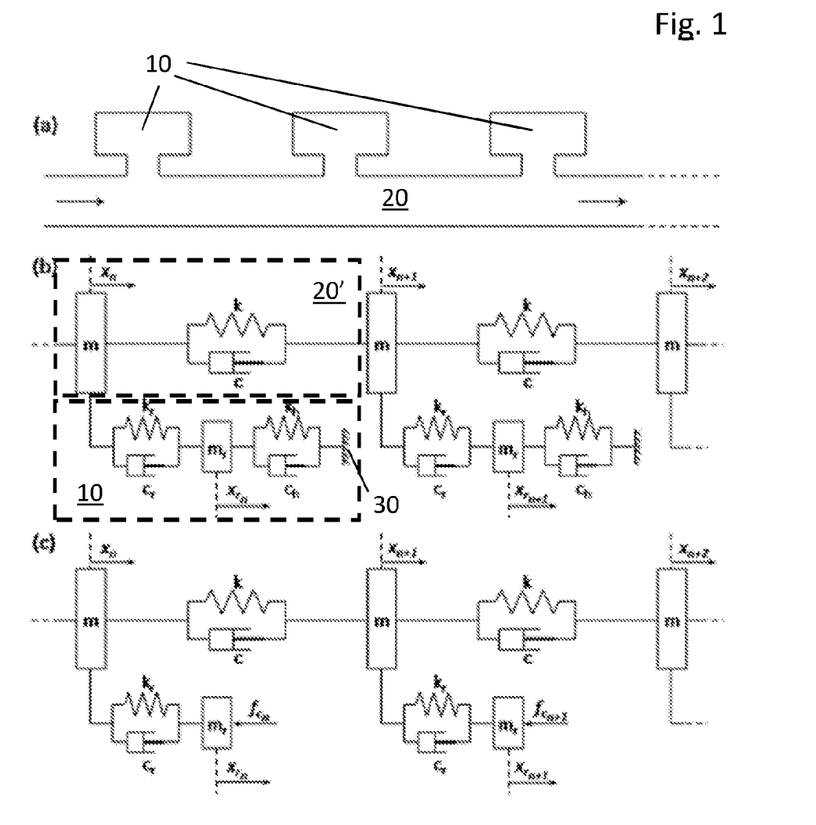
FIG. 1(a) is a schematic representation of prior-art metamaterials, specifically a series of Helmholtz resonators connected to a one-dimensional fluid flow
FIG. 1(b) is a schematic representation of prior-art metamaterials, specifically a lumped-parameter model of a series of Helmholtz resonators connected to a transmission material
FIG. 1(c) is a schematic representation of prior-art metamaterials, specifically a lumped-parameter model of a series of actively controlled periodic masses with a single elastic connection, which is to a transmission material.

An example (FIG. 1(a)) of an acoustic metamaterial having a frequency region with a negative bulk modulus is formed from an array of Helmholtz resonators 10 connected to a one-dimensional fluid transmission medium 20.

Other arrangements have been shown to possess either a negative effective modulus of elasticity or density. In the single negative (SNG) band those systems thus have a complex refractive index which acts to partially block the propagation of a pressure wave through the medium. Pope, S. A. and Daley, S. (2010) "Viscoelastic locally resonant double negative metamaterials with controllable effective density and elasticity". *Physics Letters A*, 374, 4250-4255 model (FIG. 1b) the Helmholtz resonator 10 and fluid transmission region 20 as a sequence of identical pairs of cells, each pair being formed by a Helmholtz resonator element 10 and a fluid transmission element 20'. Each Helmholtz resonator element 10 is modelled as a mass $m_r$ having displacement $x_r$, connected to a stationary reference point 30 through a stiffness element $c_h$, $k_h$ and to the transmission medium 20 through a damping element $c_r$, $k_r$. The transmission medium 20' itself is modelled as a mass m, to which the damping element $c_r$, $k_r$ is connected, itself connected to adjacent masses m by stiffness elements k, c. Effective material parameters are derived using the classical laws of motion in the form of D'Alembert's principle, assuming linear viscoelastic material properties. It is shown that a cascade of Helmholtz resonators modelled in that way, i.e. such that they are dynamically equivalent to a mass with two separate elastic connections, one to the transmission medium and the other to a stationary reference, constitutes a medium capable of providing a negative effective density but not a negative effective bulk modulus.

Pope and Daley also show that an array of Helmholtz resonators can be modelled (FIG. 1(c)) by an array of locally controlled masses $m_r$ with a single elastic connection through the damping element $c_r$, $k_r$ to the transmission medium 20. Although an array of masses $m_r$ with a single elastic connection to the transmission medium 20 again only provides a system with negative effective mass, not a negative bulk modulus, a local active control scheme $f_{cn}$ applied to each of the masses $m_r$ can emulate additional elastic connections to the supporting structure. An array of masses with a suitable local control scheme can provide both the negative effective stiffness and mass required for negative refraction. The tuneable feedback control parameters determine the characteristics of the region of double negativity. Thus, by extending the control system to take into account the motion of the transmission network, an effective homogeneous medium with the possibility of both a negative effective density and elasticity can be realised.

However, active control of the masses $m_r$ is less desirable than passive control, as it is more complex. Also, it would be desirable to extend the range of frequencies over which a negative refractive index is achievable. Furthermore, Pope and Daley's prior-art system is a theoretical proposal, and it would be desirable to provide a real-world structure exhibiting significantly reduced acoustic transmissivity, relative to comparable prior-art materials.

SUMMARY OF THE INVENTION

A first aspect of the invention provides a metamaterial for attenuating acoustic transmission, the metamaterial comprising a plurality of layers, each layer comprising:

(a) a transmission structure, and (b) a resonator, coupled to the transmission structure, wherein the transmission structure in a layer is coupled to the transmission structures of the layer(s) neighbouring said layer; CHARACTERISED IN THAT the resonator in a layer is coupled to the transmission structure of the layer(s) neighbouring said layer.

Thus, the transmission structures of successive layers are coupled together to form a continuous transmission structure extending through the plurality of layers. The resonators do not interrupt the continuous transmission structure. The transmission structures of successive layers may be considered to be coupled in series with each other and the resonators of successive layers may be considered to be coupled in parallel with the transmission structures of successive layers.

It will be understood by the skilled person that the acoustic transmission is a vibration of the transmission structure.

It may be that the resonators in all layers are coupled to the transmission structures of both of their neighbouring layers or, in the case of layers at the ends of the metamaterial, to the transmission structure of their neighbouring layer.

It may be that the transmission structures in all layers are coupled to the transmission structures of both of their neighbouring layers or, in the case of layers at the ends of the metamaterial, to the transmission structure of their neighbouring layer.

It may be that, over a band of frequencies, acoustic transmission is reduced by at least 3 dB, at least 5 dB, at least 10 dB or even at least 20 dB per layer of the metamaterial.

It may be that, over a band of frequencies, there is a bandgap in the acoustic transmission spectrum, in which acoustic transmission is reduced substantially to zero.

It may be that there are at least three of said layers. It may be that there are more than three of said layers.

It may be that the transmission structure comprises a disc or an annulus. It may be that discs or annuli of the layers are coaxial with each other. It may be that the discs or annuli are metal.

It may be that the resonator is a cylinder, for example a cylinder of circular cross-section. It may be that the cylinders of the layers are coaxial with each other. In the case in which the transmission structure comprises a disc or an annulus, it may be that the cylinders are co-axial with the discs or annuli.

It may be that the resonator in a layer is coupled to the transmission structure of the layer in which it is comprised and of the layer(s) neighbouring said layer by being suspended from those transmission structures, for example by arms, for example leaf springs.

It may be that any of the aforementioned couplings is a viscoelastic coupling. It may be that any of the aforementioned couplings is or includes an elastomeric material, for example natural rubber or neoprene. It may be that any of the aforementioned couplings is a spring, for example a coil or helical spring, a leaf spring. For example, it may be that the connection between the resonator and the transmission structure is by a leaf spring. It may be that the connection between the transmission structures of the neighbouring layers is by a coil or helical spring. It may be that the coupling is by a plurality of the couplings, distributed evenly across the resonator and/or the transmission structure.

It may be that the metamaterial includes at least one active element configured to enhance the attenuation of acoustic transmission. It may be that the at least one active element is comprised in at least one of the resonators. It may be that the active element is an actuator. For example, the actuator may be provided in a hollow (e.g. a slot or cup-like depression) in the resonator.

It may be that the resonator in a layer is coupled to the resonator of an neighbouring layer, for example via the at least one active element. It may be that the resonator in a layer is coupled to both resonators in both neighbouring layers. It may be that the resonators in all layers are coupled to the resonators of both of their neighbouring layers or, in the case of layers at the ends of the metamaterial, to the resonator of their neighbouring layer. It may be that the active element is configured to enhance the attenuation of acoustic transmission by control of reactive forces between resonator elements.

It may be that the resonator of each layer comprises an active element configured to enhance the attenuation of acoustic transmission. It may be that the active element is configured to apply a point force to the resonator.

It may be that the active element is configured to enhance the attenuation of acoustic transmission according to optimisation algorithm. It may be that the optimisation algorithm minimises the movement of an element of a layer at a first end of the layers in response to movement of an element of a layer at a second, opposite, end of the layers. The optimisation algorithm may be an optimal feedforward algorithm, for example a Filtered-x Least-Mean-Square (FxLMS) algorithm. The optimisation algorithm may be an optimal feedback algorithm, for example a H-infinity algorithm.

It may be that the plurality of layers is a periodic structure. It may be that each layer is a unit cell of the periodic structure.

A second aspect of the invention provides a method of manufacturing a metamaterial, the method comprising manufacturing the metamaterial of the first aspect of the invention by a three-dimensional printing technique, for example an additive layer technique.

It will of course be appreciated that features described in relation to one aspect of the present invention may be incorporated into other aspects of the present invention. For example, the method of the invention may incorporate any of the features described with reference to the metamaterial of the invention.

BRIEF DESCRIPTION OF THE DRAWINGS

Embodiments of the invention will now be described, by way of example only, with reference to the accompanying drawings, of which.

DETAILED DESCRIPTION

An example embodiment of the invention was manufactured in the form of an active 1-dimensional viscoelastic metamaterial consisting of a chain of transmission masses connected to each other and to resonator masses via spring elements. This locally resonant, periodic metamaterial has been developed as a proof-of-concept for a vibration isolator providing good attenuation at low frequencies. The example material achieves DNG behaviour through passive coupling of resonators to two transmission masses; in contrast, prior-art materials have one resonator mass per transmission mass and require active control to achieve double negativity.

The passively occurring band gap is enhanced using an active control architecture. Since locally resonant designs produce materials with dispersive properties, the beneficial DNG behaviour and low-frequency bandgap, although achieved passively, is in this example limited to fixed and narrow frequency bands. Active control was therefore employed to broaden the region at which attenuation is produced. The active control used in this example a Filtered-x Least Means Square (FxLMS) algorithm. The use of the active control system in conjunction with the natural passive behaviour of the metamaterial enables high levels of isolation across a broad frequency range.

For many applications, it would be desirable to create a higher density of resonant elements. As densities increase, conventional manufacturing techniques become increasingly problematic. Therefore the material presented here was designed for, and produced using, additive layer manufacturing techniques.

Figure 2:
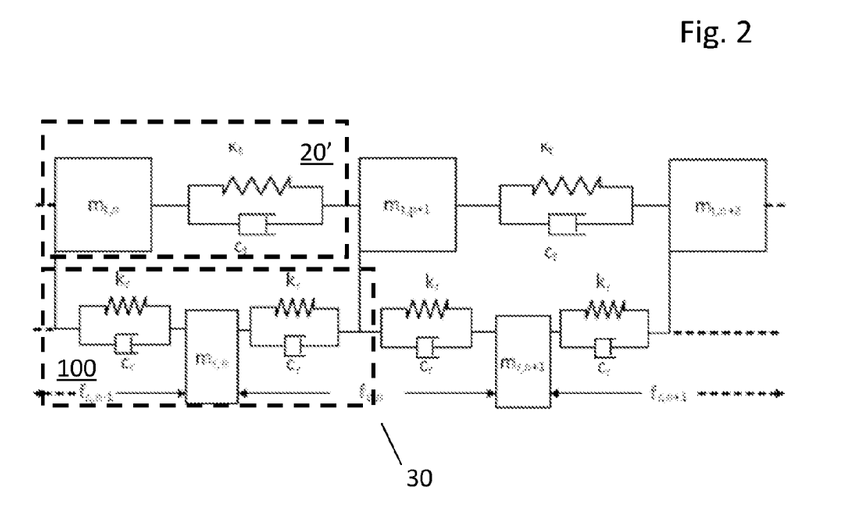
FIG. 2 is a schematic representation of a lumped-parameter model of an example of a metamaterial according to an embodiment of the invention.

A lumped-parameter model of the example metamaterial is shown in FIG. 2. The metamaterial comprises a transmission medium 20' and a resonator 100. As before, the transmission medium 20' is modelled as a mass (here labelled $m_{t,n}$ for the nth resonator element), connected to adjacent masses $m_{t,n-1}$, $m_{t,n+1}$ by stiffness elements (here labelled $k_t$, $c_t$). Again, as in the prior-art material of FIGS. 1(b) and (c), each resonator element 100 is modelled as a mass (here labelled $m_{r,n}$) connected to the transmission medium 20' through a damping element (here labelled $c_r$, $k_r$). However, in the example metamaterial of FIG. 2, there are additional viscoelastic connections (here again labelled $c_r$, $k_r$), which are added to the resonator elements 100' such that each resonator element is now connected to two adjacent transmission masses $m_{t,n}$. This passively couples the resonators in each layer of the metamaterial to transmission mass elements in the adjacent layer and provides a region of double negativity.

To provide active control, in this example reactive forces are applied between the resonator masses $m_{r,n}$, denoted by $f_{c,n}$. Use of reactive actuators simplifies the design process of the control algorithm at the expense of freedom over the nature of control forces that can be applied.

Thus the example metamaterial is modelled as an equivalent simple chain of effective masses connected by viscoelastic connections. The equation of motion for the material can be written as $$-\omega^2 M_e x_n + (i\omega C_e + K_e)(2x_n - x_{n+1} - x_{n-1}) = f_n \quad (1)$$

where $M_e$ is the effective mass, $(i\omega C_e + K_e)$ is the stiffness and damping, $\omega$ is the frequency of oscillation, $x_n$ is the displacement of the nth mass in the chain and $f_n$ is the force on that mass. By formulating and rearranging the equation of motion for the explicit material model of FIG. 2, we can write:

$$-\omega^2 \left( m + \frac{2m_r(k_r + j\omega c_r)}{-\omega^2 m_r + 2(k_r + j\omega c_r)} \right) x_n \ldots + \quad (2)$$

$$\left( k + j\omega c + \frac{(k_r + j\omega c_r)^2}{-\omega^2 m_r + 2(k_r + j\omega c_r)} \right)(2x_n - x_{n+1} - x_{n-1}) = f_n$$

where m, k and c are used to denote the properties of the transmission medium and the subscript r is used to denote the properties of the resonators. By comparing (1) and (2), we see that the effective mass, $M_e$, and stiffness and damping $K_e + j\omega C_e$ are given by $$M_e = m + \frac{2m_r(k_r + j\omega c_r)}{-\omega^2 m_r + 2(k_r + j\omega c_r)} \quad (3)$$

$$K_e + j\omega C_e = k + j\omega c + \frac{(k_r + j\omega c_r)^2}{-\omega^2 m_r + 2(k_r + j\omega c_r)} \quad (4)$$

Those expressions are complex: $\text{Im}(M_e)$ is an additional dissipative term introduced by the presence of damping within the resonator elements 100, whilst $\text{Re}(M_e)$ is the effective inertial mass of the system and the quantity of interest. Likewise the real part of $K_e + j\omega C_e$ is the effective stiffness of the system, with the imaginary part being the dissipative effective damping. The effective stiffness and the mass both resonate at the same frequency as each other, meaning that the regions of negative effective material parameters will intersect, and therefore the material will be double negative when both are negative.

Figure 3:
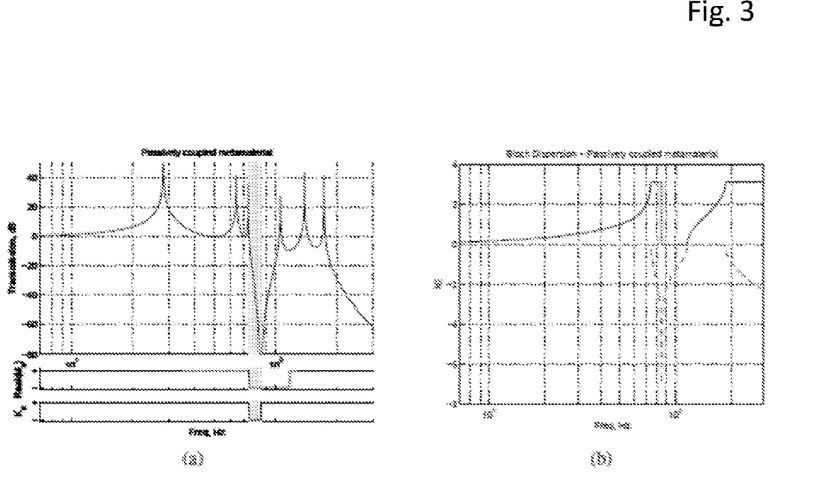
FIG. 3(a) is, for a metamaterial according to an example embodiment of the invention having four coupled layers, modelling results for the passive transmission response (transmission in dB versus frequency in Hz—the double negative region is shown shaded)
FIG. 3(b) is, for a metamaterial according to an example embodiment of the invention having four coupled layers, modelling results for the dispersion relationship (kd versus frequency in Hz) of the material.

A typical passive material transmission response (the motion of the last transmission mass related to the first), including the sign of each material parameter is shown in FIG. 3(a) for the material model.

The double negative region (highlighted in grey in FIG. 3(a)) is co-incident with the region of attenuation known as the band gap. Previous studies have suggested that the band gap occurs when the metamaterial becomes single negative, causing the wave vector, k, to become imaginary, indicating an evanescent rather than travelling solution to the wave equation, and that when the material is made to be double negative, a passband occurs in what is now a 'left-handed' material. The skilled person having regard to the prior art would therefore expect the transmissivity to increase in the double-negative region, compared with its value in an adjacent single-negative regions. However, that explanation neglects dissipative losses within the material. The Bloch dispersion relationship of a periodic metamaterial of this type, of infinite length and having period d is $$\cos kd = 1 - \frac{\omega^2 M_e}{K_e + j\omega C_e} \tag{5}$$

The solution will be complex for a DNG material if the effective material parameters are complex themselves, resulting in a travelling (real) wave with an attenuation (imaginary) envelope. When the relationships governing the effective material parameters resonate, the magnitude of imaginary terms become very large, leading to high levels of attenuation. Whilst not a 'complete' band gap, as defined by Bloch-Floquet theory, attenuation levels are so high as to effectively behave as a band gap. Solving Equation 5 for kd gives the dispersion characteristics of the material, plotted in FIG. 3(b). It is clear that the region where the magnitude of the imaginary part of the wave number becomes large coincides with the band gap of the material response. (Note that due to the restricted domain of the $\cos^{-1}$ function, the calculated real part of the dispersion characteristic is restricted to $0 \leq kd \leq \pi$, hence the truncation in FIG. 3(b); in reality, the wave number is not bound in this way).

The metamaterial consists of a number of periodic layers, therefore a convenient method for modelling vibration propagation through the material is to consider the material as a series of 4-pole linear ported networks making up a transmission line. Here, a transfer matrix is formulated to describe the transform from one state vector to another across the chain of masses (e.g. $q_n \rightarrow q_{n+1} \ldots \rightarrow q_N$). To formulate the transfer matrix the state vectors representing the force (f) and displacement (q) of each cell of the chain are considered, where in this case these state vectors are scalar values and each cell consists of a single set of equivalent mass-spring-damper elements. Now, the relationship between the force and displacement across a multiple layer material can be considered in terms of the transfer matrices, T, such that $$\begin{Bmatrix} q_N \\ f_N \end{Bmatrix} = \prod_0^N T_n \begin{Bmatrix} q_0 \\ f_0 \end{Bmatrix} = \tau \begin{Bmatrix} q_0 \\ f_0 \end{Bmatrix} \tag{6}$$

$$T_n = \begin{bmatrix} 1 - \frac{\omega^2 M_e}{K_e + j\omega C_e} & -\frac{1}{K_e + j\omega C_e} \\ \omega^2 M_e & 1 \end{bmatrix} \tag{7}$$

Note that if the multiple layers are identical, as is the case with a periodic metamaterial, the product of transfer matrices reduces to $\tau = T^N$. Also note that $|T|=1$, which is a property of reciprocal systems, and more specifically a constraint of passive, linear, four-pole networks. By applying the initial condition $f_N=0$ the transmission transfer function, H, of the material from the first to the last mass is given by Equation 8 where the subscript (p,q) denotes the pth and qth column of $T^N$.

$$H_T = \frac{x_N}{x_0} = \left( T_{1,1}^N - \frac{T_{1,2}^N T_{2,1}^N}{T_{2,2}^N} \right) \tag{8}$$

Figure 4:
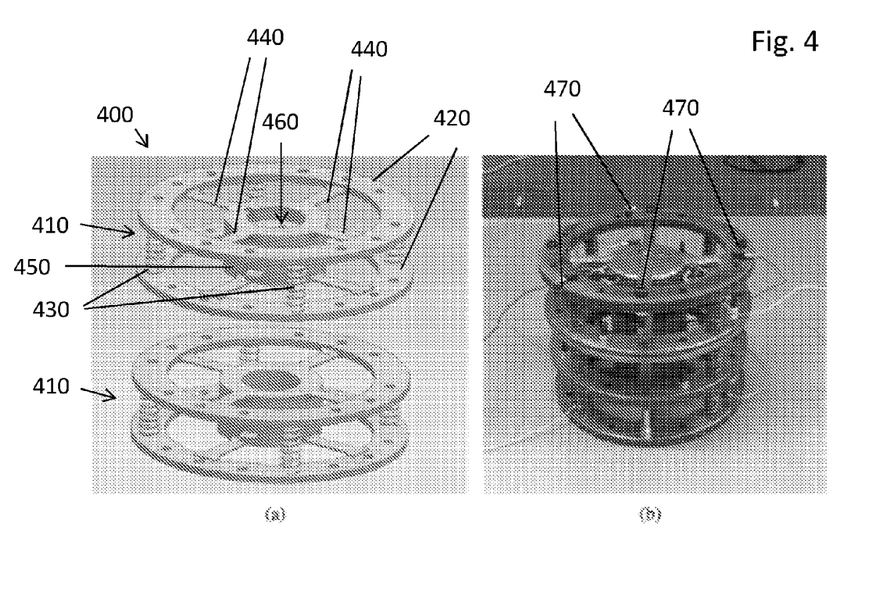
FIG. 4(a) is a 3D CAD representation of the construction of the metamaterial of FIGS. 3(a) and 3(b)
FIG. 4(b) is a photograph of the experimentally realised metamaterial in accordance with the metamaterial of FIGS. 3(a) and 3(b)

A 4-layer experimental realisation of the metamaterial was constructed. A CAD representation of the cell design is shown in FIG. 4(a), alongside a photo of the experimental setup in FIG. 4(b).

The metamaterial 400 is made from a stack of cells 410. Each cell 410 is in the form of a pair of identical titanium annuli 420, arranged co-axially with each other. The annuli 420 are connected directly to each other by four helical springs 430, evenly spaced around the annuli 420. Each annulus 420 is also connected to the outer ends of four leaf springs 440. The inner ends of the four leaf springs 440 are connected to a cylindrical mass 450. Thus, the cylindrical mass 450 is suspended by eight leaf springs 440 from the pair of annuli 420, with four attached to a first end surface of the cylinder and four attached to the opposite end surface. The cell 410 was produced using an additive layer selective laser melting (SLM) technique, so each cell 410 is a discrete titanium structure. The annuli 420 of separate cells 410 were then bolted together to produce a continuous, periodic metamaterial 400. The metamaterial shown in FIG. 4(b) consists of three of the cells 410.

Considered in terms of the model of FIG. 2, the titanium annuli 420 and coil springs 430 form the mass and damped oscillator of the transmission medium 20' and the cylindrical mass 450 and leaf springs 440 form the mass and damped oscillators of the resonator 100. Note that each cylindrical mass 450 is connected to the two annuli 420 to which it is adjacent, i.e. each resonator mass is connected to two transmission masses via damped oscillators, as in FIG. 2.

The resonator cylindrical mass 450 includes a hollow 460 in which is accommodated a voice-coil reactive actuators (not shown), so that control forces can be applied (again in accordance with FIG. 2).

To measure the response of the complete metamaterial 400, the structure was bolted to a steel plate which was then excited using an inertial actuator. The motion of the top and bottom annuli 420 was then measured using accelerometers 470, and the transfer function calculated. A dSpace® rapid prototyping system was used to provide the excitation signal as well as record the accelerometer signals.

Active control was also be applied using the dSpace® system, which processes the accelerometer signals in real time using an appropriate algorithm to apply control forces to the reactive actuators. For experimental expediency, a single channel Filtered-x Least Mean Squared (FxLMS) algorithm was used, as it is a well-established, robust algorithm that could be simply implemented to demonstrate the efficacy of the active approach. The algorithm was employed to minimise the acceleration of the top annulus 420 using the acceleration of the bottom annulus 420 as a reference signal. Although the active material contained two actuators, in this instance only one was employed.

Figure 5:
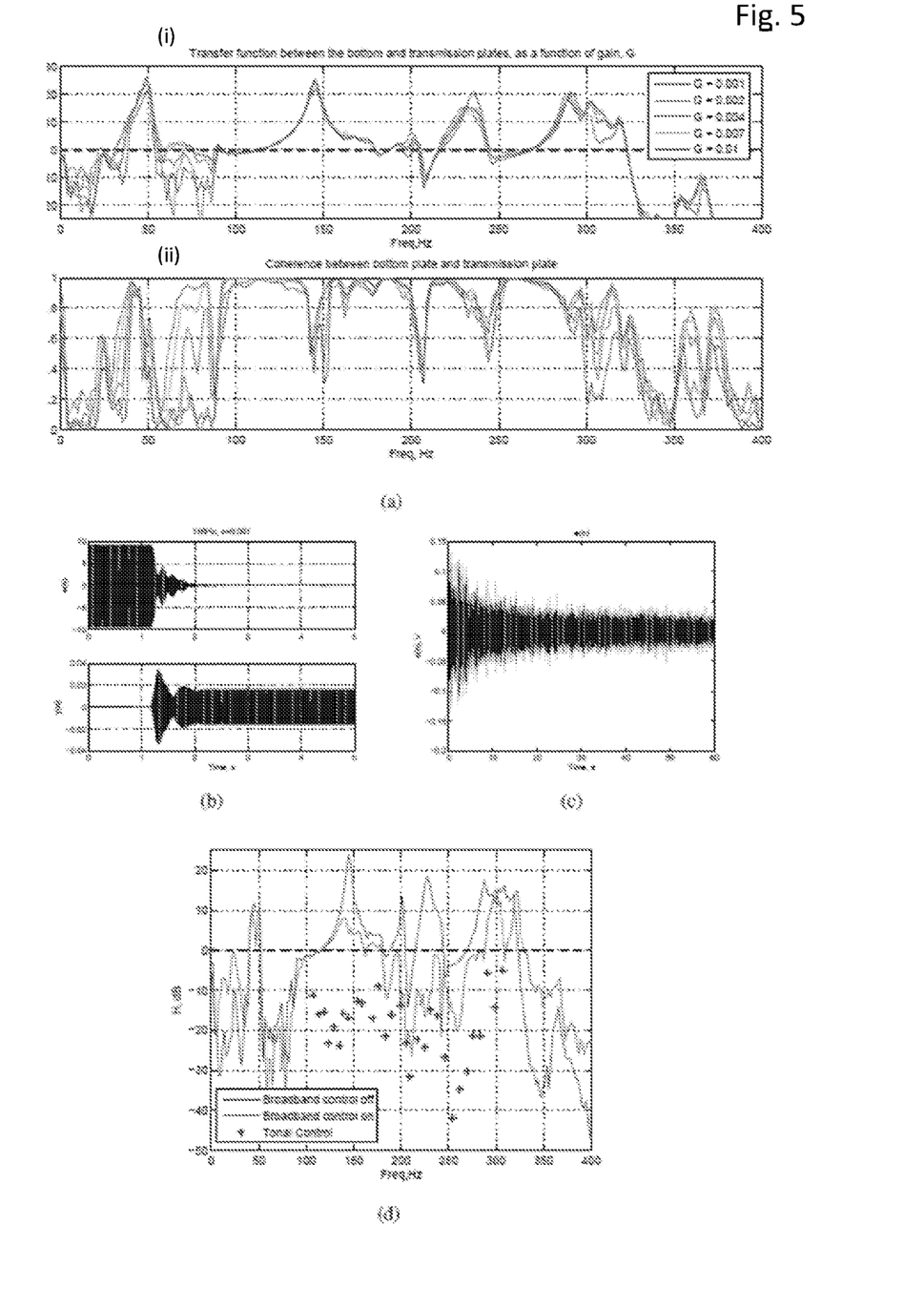
FIG. 5(a) is, for the metamaterial of FIGS. 3(a), 3(b), 4(a) and 4(b), the transmission spectrum at varying levels of input disturbance, wherein graph (i) is a transfer function between the bottom and transmission plates, as a function of gain G, versus frequency in Hz, and graph (ii) shows coherence between the bottom and transmission plates versus frequency in Hz.
FIG. 5(b) is a time history of the active metamaterial when control is applied after approximately 1 second showing the top transmission plate acceleration (top) and control signal (bottom) for a 146 Hz tonal disturbance.
FIG. 5(c) is a time history of the active metamaterial when control is applied after approximately 1 second showing the acceleration of the top transmission plate for a band limited broadband disturbance.
FIG. 5(d) is a comparison of the reduction in transmission achieved for a broadband input with the equivalent maximum reduction achieved to a tonal input at each frequency.

FIG. 5(a) presents (i) the passive response of the material for different excitation levels, as well as (ii) the coherence between the signals measured at the bottom and top annuli 420. The material was designed to have a passive response as shown in FIG. 3(a), and initially it was believed that there was evidence of a band gap at approximately 80 Hz as expected. However, it can be seen in FIG. 5(a) that the attenuation in that region decreases as the excitation level increases; the behaviour therefore appears to be the consequence of a non-linearity. That is thought to be due to the presence of stiction within the actuator assemblies due to misalignment, as well as a significant air-spring effect. However, it can be seen from the response that there are stable band gaps at higher frequencies: there is a deep, narrow gap at 207 Hz, and a wider but shallow gap around 250 Hz. It became clear during the manufacturing process that the additive layer manufacturing technique employed was being stretched to its limits, and, in light of that, the discrepancy in the predicted and achieved band gap frequencies is perhaps not surprising. Of particular consequence is the specification of the leaf springs 440, the stiffness of which very sensitive to their thickness; manufacturing difficulties meant that the leaf springs 440 produced were of varying thickness. In addition to these inconsistencies, several of the springs 440 were warped and did not sit parallel with the annuli 420. That is likely to have had a large effect on the stiffness of the resonators, meaning that they are not resonating at the designed frequency, nor necessarily at the same frequency as each other. Whilst the resulting response of this particular physical realisation of the material is not one that would be desirable in a passive isolation application, the material does indicate the potential of the approach, and provides a useful proof of the concept of applying active control to enhance the attenuation properties of viscoelastic metamaterials.

The FXLMS algorithm was applied to control the acceleration of the top annulus 420 initially for tonal disturbances, and later for a white noise disturbance that was band-limited from 100 Hz to 300 Hz. FIGS. 5(b) and 5(c) show time histories for the top annulus 420 after control has been applied for both tonal and broadband disturbances respectively, demonstrating that the controller is able to achieve a considerable reduction in the transmission relative to the passive performance. The tonal control is achieved using two filters of 1 coefficient, controlling the amplitude of an in-phase and a quadrature version of the reference signal to cancel out the disturbance. To control a broadband disturbance, a single control filter of 2048 coefficients is shaped by the FxLMS algorithm.

FIG. 5(d) shows the transmission spectrum of the passive material alongside the performance achieved by the active material when subject to the band-limited broadband disturbance. Also plotted on the graph are the equivalent reductions achieved by the tonal controller at each distinct frequency. The performance of the broadband controller is limited by the length of the control filter, and the tonal results can be considered a guide to the maximum performance that could be achieved using this set up, either using a longer filter or using a more refined broadband control algorithm. The broadband results demonstrate that over the frequency span where excitation is present there is a significant improvement over the passive isolation performance. The naturally occurring band gap has been significantly broadened, and peak attenuation levels have been enhanced significantly. Detrimental out of band resonances have also been suppressed, notably at 146 Hz.

The tonal results show that significant isolation performance can be achieved over a broad frequency range, in some cases up to 40 dB. Of significance is the fact that the greatest levels of attenuation are achieved where the natural band gaps occur. This supports the argument for using active periodic materials in vibration isolation applications over more traditional active isolation mounts. A unified design process that matches the best features of both active and passive functionality can provide impressive levels of attenuation over wide band widths. Despite the fact that the experimental metamaterial did not match the original design specification, the results demonstrate a proof of concept that active architecture can be used to enhance the passive performance of metamaterials, and in particular the narrowband behaviour inherent in periodic, locally resonant designs.

In summary, as an example embodiment of the invention, a 1-dimensional viscoelastic metamaterial was designed that displayed double negative behaviour passively. An active control architecture was incorporated into the design to facilitate the enhancement of the level and bandwidth of attenuation associated with the resonant band gap. With a view to producing such materials at smaller dimensions, the metamaterial was designed for manufacture using additive-layer manufacturing techniques. An experimental demonstration of the material design was created from titanium using a selective laser melting additive layer technique. The limitations of this fledgling technology had a detrimental impact on the resulting dynamics of the material, however it was demonstrated that resonant band gaps appear in the passive transmission response. Furthermore it was shown that the level and bandwidth of attenuation of these passive band gaps can be enhanced through the use of the active architecture.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A metamaterial for attenuating acoustic transmission, the metamaterial comprising a plurality of layers, each layer comprising:
    (a) a transmission structure, and
    (b) a resonator, coupled to the transmission structure,
    wherein the transmission structure in a layer is coupled by a coupling element to the transmission structures of the layer(s) neighboring said layer; wherein the resonator in a layer is coupled by a coupling element to the transmission structure of the layer(s) neighboring said layer.

2. A metamaterial as claimed in claim 1, in which there are at least three of said layers.

3. A metamaterial as claimed in claim 1, in which the transmission structure comprises a disc or an annulus.

4. A metamaterial as claimed in claim 3, in which the discs or annuli of the layers are coaxial with each other.

5. A metamaterial as claimed in claim 1, in which the resonator is a cylinder.

6. A metamaterial as claimed in claim 5, in which the cylinders of the layers are coaxial with each other.

7. A metamaterial as claimed in claim 6, in which the transmission structure comprises a disc or an annulus and the cylinders are co-axial with the discs or annuli.

8. A metamaterial as claimed in claim 1, in which any of the couplings are viscoelastic couplings.

9. A metamaterial as claimed in claim 1, in which the metamaterial includes at least one active element configured to enhance the attenuation of acoustic transmission.

10. A metamaterial as claimed in claim 9, in which the at least one active element is comprised in at least one of the resonators.

11. A metamaterial as claimed in claim 9, in which the active element is configured to enhance the attenuation of acoustic transmission by control of reactive forces between resonator elements.

12. A metamaterial as claimed in claim 9, in which the active element is configured to apply a point force to the resonator.

13. A metamaterial as claimed claim 9, in which the active element is configured to enhance the attenuation of acoustic transmission according to an optimization algorithm.

14. A metamaterial as claimed in claim 13, in which the optimization algorithm minimizes the movement of an element of a layer at a first end of the layers in response to movement of an element of a layer at a second, opposite, end of the layers.

15. A method of manufacturing a metamaterial, the method comprising manufacturing the metamaterial of claim 1 by a three-dimensional printing technique.

\* \* \* \* \*